W. T. KOSINSKI.
Improvement in Purifying Gas.
No. 126,717.  Patented May 14, 1872.
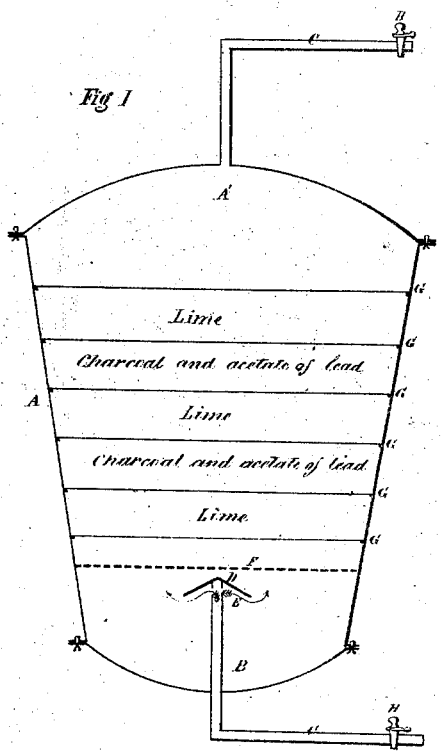
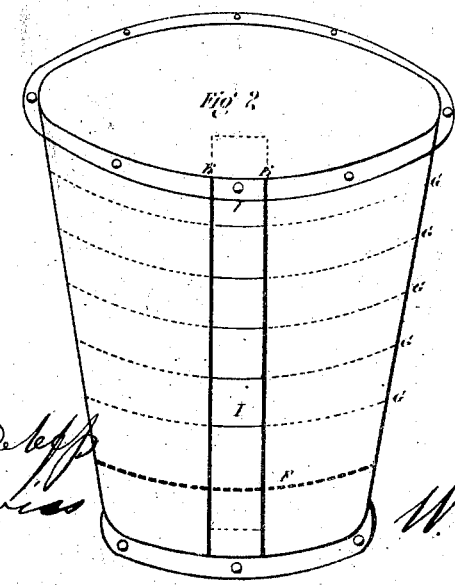
Witnesses.
Inventor 126,717

UNITED STATES PATENT OFFICE.

WLADYSLAW THEODORE KOSINSKI, OF PHILADELPHIA, PENNA., ASSIGNOR OF ONE-THIRD OF HIS RIGHT TO GEORGE W. GILL, OF SAME PLACE.

IMPROVEMENT IN PURIFYING GASES.

Specification forming part of Letters Patent No. 126,717, dated May 14, 1872.

SPECIFICATION.

I, WLADYSLAW THEODORE KOSINSKI, of the city and county of Philadelphia, State of Pennsylvania, have invented certain Improvements in an Apparatus for Purifying Gas.

The nature of my invention consists in purifying gas by passing it through an apparatus filled with alternate layers of lime and charcoal, combined with acetate of lead.

Figure 1 represents a sectional view. Fig. 2 represents a perspective view of the main reservoir, showing the glass door.

A represents the main reservoir. A' represents the lid with outlet-tube attached. B represents the receptacle for water generated within the reservoir, and particles of the compound that may drop through the plate F. C represents the inlet and outlet tubes for the passage of the gas. D represents the shield or tube-protector. E represents the perforations in the tube under the shield. F is the perforated plate; G, the wire-gauze shelves for the compound to be deposited upon; H, stop-cock; I, glass-door. The apparatus consists of the main reservoir, an upper, and a lower cover. All these parts have external flanges, provided with perforations, bolted together. Through the center of the lower cover passes a tube, which has on its extremity two or more perforations, covered by a shield, through which the gas passes. The main reservoir has a number of shelves arranged within. Said shelves are made of fine wire-gauze. The bottom shelf of the main reservoir consists of a perforated metallic plate, upon which no chemicals are placed. The upper cover has a corresponding tube projecting from the center for the outlet of the gas. The tubes described have branch tubes, provided with stop-cocks for regulating the flow of gas.

The operation is as follows: Gas is introduced through the lower tube, which passes through the perforated plate and alternate layers of lime, charcoal, and acetate of lead combined. It then ascends into the space formed by the upper part of the reservoir, and through the outlet-tube in a purified state.

I am aware that gas is being purified in gas-manufactories, but it still contains some of the sulphur combinations; also carbonic acid, the presence of which latter detracts much from the brilliancy of the light, and by burning, it produces sulphurous and sulphuric acid, either of which is very detrimental to the health, seriously injuring the lungs of persons burning such unpurified gas. It has also a very bad effect upon paintings, metals, and furniture in the rooms. By passing the gas through this apparatus packed with alternate layers of lime and charcoal mixed with acetate of lead, the gaseous sulphur combinations will decompose entirely, so that the sulphur of the sulphureted hydrogen and sulphurous acid will combine and form sulphur of lead and sulphite of lead. The acetic acid from the acetate of lead combines with the lime.

The great absorption of gases by carbons is too well known to need comment. It likewise serves to hasten the more quick and perfect combination of the lead. The proportion of the mixture of charcoal and acetate of lead are, two of the former and one of the latter. In order to insure the perfect purification of the gas, it will be necessary to renew the compounds at intervals. The time for the renewal of said materials can be ascertained by their discoloration, which is visible through the air-tight glass-door or window on the reservoir. The lower receptacle should be occasionally looked after and cleaned, as water will accumulate, and particles of the chemicals with which the reservoir is packed will drop through the perforated plate to the bottom of said receptacle. This mode of purification is very valuable, as it gives a brilliant light, void of bad odor, and it is not injurious to health.

What I claim as new, and desire Letters Patent for, is—

The mode of purifying gas by means of the above-described apparatus packed with alternate layers of lime and charcoal, mixed with acetate of lead in the proportions substantially as and for the purpose described.

W. T. KOSINSKI.

Witnesses:
   D. MINDELEFF,
   D. O. DAVIES.